United States Patent [19]

Okauchi et al.

[11] Patent Number: 5,138,885
[45] Date of Patent: Aug. 18, 1992

[54] PIEZOELECTRIC-TYPE PRESSURE SENSOR

[75] Inventors: Tohru Okauchi, Katano; Hiroki Kusakabe, Osaka; Masuo Takigawa, Ikoma, all of Japan

[73] Assignee: Matsushita Electric Industrial Co., Ltd., Osaka, Japan

[21] Appl. No.: 668,256

[22] Filed: Mar. 12, 1991

[30] Foreign Application Priority Data

Mar. 16, 1990 [JP] Japan ................. 2-067718
Jul. 12, 1990 [JP] Japan ................. 2-186441
Aug. 24, 1990 [JP] Japan ................. 2-222754

[51] Int. Cl.⁵ ............................................. G01L 9/08
[52] U.S. Cl. ....................................... 73/723; 73/708; 73/754; 73/756
[58] Field of Search ........... 73/756, 723, 720, 754, 73/706, DIG. 4, 720, 708, 861.24, 115, 753, 726; 310/338

[56] References Cited

U.S. PATENT DOCUMENTS

| | | | |
|---|---|---|---|
| 4,503,351 | 3/1985 | Sonderegger et al. | 310/329 |
| 4,519,254 | 5/1985 | Sonderegger | 73/726 |
| 4,620,438 | 11/1980 | Howng | 73/35 |
| 4,735,091 | 4/1988 | Engeler et al. | 73/723 |

FOREIGN PATENT DOCUMENTS

| | | |
|---|---|---|
| 258610 | 12/1967 | Austria . |
| 383895 | 9/1987 | Austria . |
| 0090872 | 10/1983 | European Pat. Off. . |
| 3333315 | 3/1985 | Fed. Rep. of Germany . |
| 3545682 | 6/1987 | Fed. Rep. of Germany . |
| 3811311 | 3/1989 | Fed. Rep. of Germany . |
| 49-29782 | 4/1974 | Japan . |
| 54-130026 | 9/1979 | Japan . |
| 55-109941 | 1/1980 | Japan . |
| 58-730 | 3/1983 | Japan . |
| 59-79385 | 5/1984 | Japan . |
| 60-183534 | 9/1985 | Japan . |
| 60-259347 | 9/1985 | Japan . |
| 61-145428 | 7/1986 | Japan . |
| 61-166759 | 7/1986 | Japan . |
| 61-207942 | 8/1986 | Japan . |
| 62-48252 | 3/1987 | Japan . |
| 62-224780 | 10/1987 | Japan . |
| 62-233578 | 10/1987 | Japan . |
| 63-102834 | 5/1988 | Japan . |
| 63-125855 | 5/1988 | Japan . |
| 63-501586 | 7/1988 | Japan . |
| 63-234600 | 9/1988 | Japan . |
| 63-235842 | 9/1988 | Japan . |
| 127274 | 1/1989 | Japan . |
| 1259835 | 10/1989 | Japan . |
| 1283414 | 12/1989 | Japan . |
| 1315270 | 12/1989 | Japan . |
| 27876 | 1/1990 | Japan . |
| 27877 | 1/1990 | Japan . |
| 236774 | 2/1990 | Japan . |
| 241674 | 2/1990 | Japan . |
| 241675 | 2/1990 | Japan . |
| 277718 | 3/1990 | Japan . |
| 280908 | 3/1990 | Japan . |
| 285735 | 3/1990 | Japan . |
| 295232 | 4/1990 | Japan . |
| 2119582 | 5/1990 | Japan . |
| 2129406 | 5/1990 | Japan . |
| 2154922 | 6/1990 | Japan . |
| 2190348 | 6/1990 | Japan . |
| 2198854 | 8/1990 | Japan . |
| 2203837 | 9/1990 | Japan . |
| 2230274 | 9/1990 | Japan . |
| 2233255 | 9/1990 | Japan . |
| 2236431 | 9/1990 | Japan . |
| 1125500 | 8/1968 | United Kingdom . |

Primary Examiner—Donald O. Woodiel
Attorney, Agent, or Firm—Stevens, Davis, Miller & Mosher

[57] ABSTRACT

Members as an upper fixing screw, a piezoelectric element, a pressure transmitting member are located closer to region of an engine to be measured and the like than a fitting thread portion of a sensor casing so that a prestress on the piezoelectric element can be constantly maintained at a predetermined value, thus enabling pressure measurement with a high degree of accuracy. Further, a projecting portion or a spacer is provided on the backside of a pressure receiving surface in order to ensure the surface contact between the pressure transmitting member and the back surface of the pressure receiving surface, thus preventing the stress from concentrating on corners of the bottom surface of the pressure transmitting member.

13 Claims, 7 Drawing Sheets

PIEZOELECTRIC-TYPE PRESSURE SENSOR

BACKGROUND OF THE INVENTION

1. Industrial Field of the Invention

The present invention relates to a pressure sensor of a piezoelectric type suitable for detecting a pressure such as a combustion pressure within a cylinder of an internal combustion engine.

2. Description of the Related Art

Figure 5:
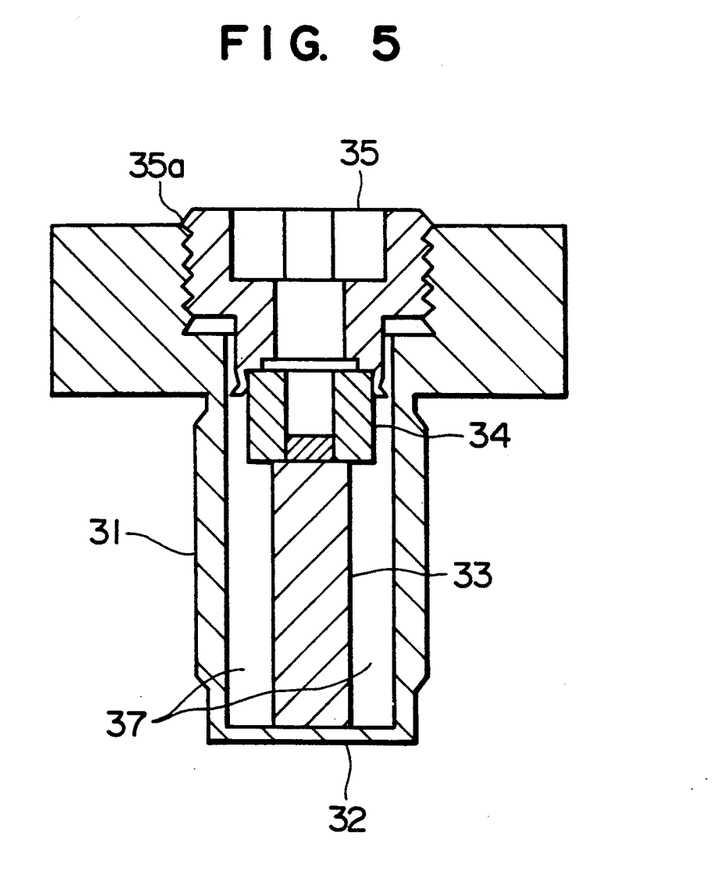
FIG. 5 is a cross-sectional view of a conventional piezoelectric-type pressure sensor.

Conventionally, there has been often employed a piezoelectric-type pressure sensor which utilizes a piezoelectric effect that application of stress induces generation of electric change. Especially in recent years, development of a pressure sensor suitable for detecting a combustion pressure within a cylinder of an internal combustion engine or the like has been prosperous. FIG. 5 illustrates a basic structure of a piezoelectric-type pressure sensor disclosed in Japanese Patent Unexamined Publication No. 63-109342. This is a vertical cross-sectional view of the sensor in which a piezoelectric element 34 is provided at the inside of a sensor casing 31. When an upper fixing screw 35 is tightened through a screw portion 35a, the piezoelectric element 34 is pressed through a pressure transmitting member 33 and fixed against the backside of a pressure receiving surface 32 machined in the form of a diaphragm, while it is given pre-stress. This pre-stress is required for measuring a negative pressure particularly when measuring a combustion pressure within a cylinder of an internal combustion engine.

The operation of the pressure sensor will now be described.

A pressure to be measured is applied to the pressure receiving surface 32 from the outside of the sensor casing 31. This pressure is transmitted through the pressure transmitting member 33 so as to press an inner peripheral portion of the cylindrically-shaped piezoelectric element 34 while an upper outer-peripheral portion of the piezoelectric element 34 is depressed by reaction of the upper fixing screw 35. As a result, a shear force is given to the piezoelectric element 34 because the downward farce is exerted on its upper outer-periphery whereas the upward force is exerted on the lower inner-periphery. Then, there is generated an electric charge corresponding to this stress which is detected in the form of an electric signal from electrodes (not shown) provided on the piezoelectric element 34.

However, the above-described arrangement involves the following problems.

Figure 6:
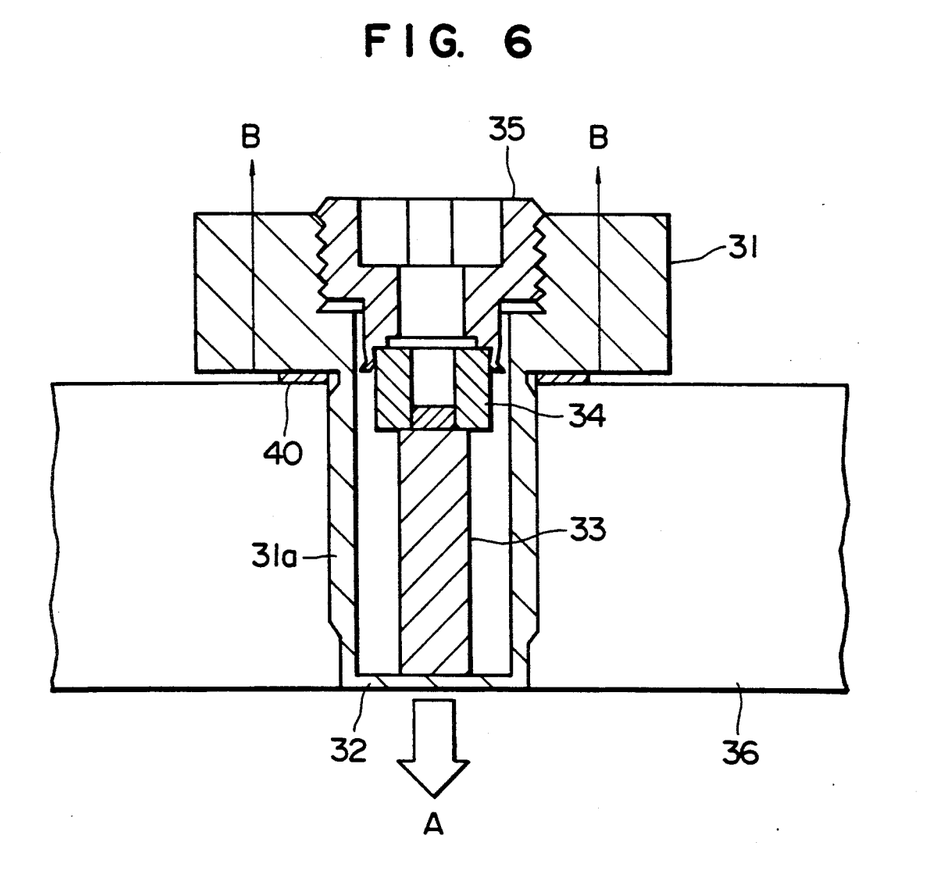
FIG. 6 is a cross-sectional view of the conventional piezoelectric-type pressure sensor when it is fitted on a main body of an engine.

A first problem will be explained referring to FIG. 6. In order to fit the pressure sensor onto an engine body 36 to be subjected to pressure measurement, a sensor casing thread portion 31a is fitted onto a threaded bore in the engine body 36, and then, the sensor casing 31 is tightened into the engine body 36. As the sensor casing 31 is tightened, the lower portion of the sensor casing 31 which includes the thread portion 31a is pressed in a direction indicated by an arrow A while the upper portion of the sensor casing 31 is retained by the top surface of the engine body 36 and affected by a force in a direction indicated by arrows B. Regarding the sensor casing 31 as a whole, therefore, tensile stress is generated with respect to a portion in the vicinity of a seal member 40, resulting in distortion in its axial direction. Under such a situation, the position of the upper fixing screw 35 is fixed. However, as the sensor casing thread portion 31a is tightened, the position of the pressure receiving surface 32 and the position of the pressure transmitting member 33 are displaced in the direction A, and pre-stress which is preset relative to the piezoelectric element 34 is gradually decreased, thereby generating a fluctuation of the sensor output unfavorably. Besides, the contact of the piezoelectric element 34 with the pressure transmitting member 33 and with the upper fixing screw 35 becomes unstable to make the transmitted pressure non-uniform or to make the pressure transmission impossible.

A second problem will now be explained. The pressure receiving surface 32 of the sensor casing 31 is usually pressed in the axial direction by a tightening force of the upper fixing screw 35 through the pressure transmitting member 33 and the piezoelectric element 34. A portion where the pressure receiving surface 32 is in contact with the pressure transmitting member 33 is illustrated in an enlarged cross-sectional view of FIG. 7. Referring to this drawing, due to the tightening force of the upper fixing screw, the pressure receiving surface 32 is pressed toward the side opposite to the pressure transmitting member 33 and bent downwardly. Then, since the pressure transmitting member 33 is formed of a ceramic material or the like having high rigidity which transmits the pressure effectively, the pressure receiving surface 32 thus bents is not in surface-contact with the pressure transmitting member 33, but only an outer peripheral portion of the end face of the pressure transmitting member 33 is in contact with the backside of the pressure receiving surface 32. As a result, the stress concentrates on this contact portion alone, and when the pressure receiving surface 32 is affected by a force from a region 38 to be measured, the outer peripheral portion of the end face of the pressure transmitting member 33 is cracked by the concentrated stress so that the pressure transmitting member 33 thus broken unfavorably interferes with accurate measurement of the pressure.

SUMMARY OF THE INVENTION

Object of the Invention

An object of the present invention is to provide a pressure sensor of a piezoelectric type which has high durability and performs pressure measurement with a high degree of accuracy as a result of preventing pre-stress given on a piezoelectric element from decreasing and also preventing the piezoelectric element and a pressure transmitting member from being broken.

Basic Structure of the Invention

In order to achieve the above-mentioned object, concerning a positional relationship between an upper fixing screw and a fitting thread portion of a sensor casing, the upper fixing screw is located closer to a region of an engine to be measured than the fitting thread portion. With this structure, even if a tightening force causes the sensor casing to be distorted in its axial direction when the fitting thread portion is tightened to fit the sensor onto a main body of the engine, this distortion occurs at a location where it does not influence upon other members inside the sensor casing. Therefore, a positional relationship of the upper fixing screw, a piezoelectric element, a pressure transmitting member and a pressure receiving surface is not unfavorably affected, and a predetermined pre-stress is not reduced, thereby enabling accurate measurement of a pressure.

In addition, a projecting portion is provided on the back side of the pressure receiving surface in order to bring the top surface of the projecting portion in surface contact with an end face of the pressure transmitting member, or a spacer is provided between the backside of the pressure receiving surface and the end face of the pressure transmitting member, which spacer is formed of a material which is adequately soft so that it does not interfere with the pressure transmission. With such a structure, even if the pressure receiving surface is pressed and bent downwardly by the pressure transmitting member due to the tightening force of the upper fixing screw, the backside of the pressure receiving surface and the pressure transmitting member or the spacer are constantly maintained in surface contact with each other, preventing the stress from concentrating on an outer peripheral portion of the pressure transmitting member and also preventing the pressure transmitting member from being broken, thereby enabling the pressure measurement to be performed reliably and precisely.

DETAILED DESCRIPTION OF THE INVENTION

Embodiments of the present invention will be described hereinafter with reference to the attached drawings.

Figure 1:
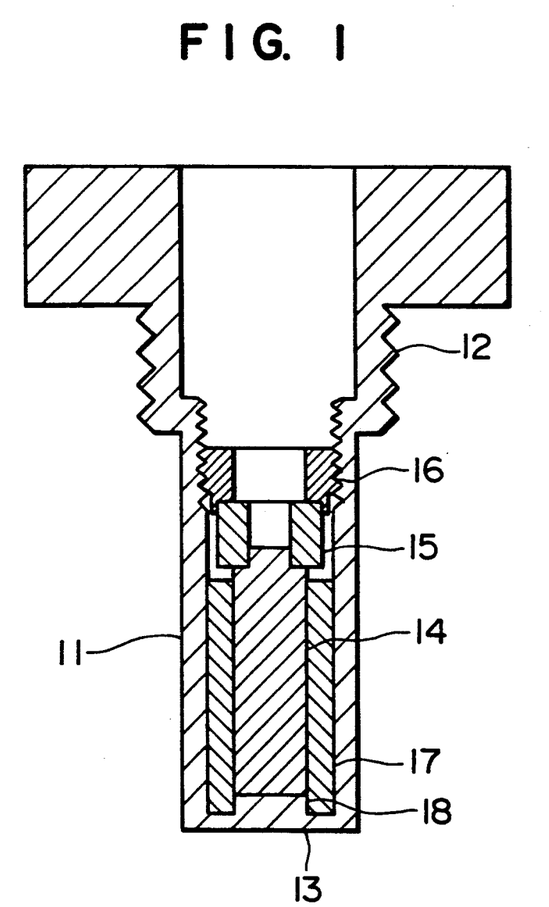
FIG. 1 is a cross-sectional view of a piezoelectric-type pressure sensor according to a first embodiment of the present invention.

FIG. 1 is a cross-sectional view of one embodiment of a piezoelectric-type pressure sensor according to the present invention. In the drawing, reference numeral 11 denotes a sensor casing having a bolt-like external configuration and having, at its one end, a pressure receiving surface 13 in the form of a diaphragm for receiving pressure from a region of an engine to be measured. There is provided a fitting thread portion 12 for fitting the pressure sensor to a main body of the engine. There is also provided a pressure transmitting member 14 for transmitting a measured pressure from the pressure receiving surface 13 to a piezoelectric element 15. The piezoelectric element 15 is of a cylindrical shape, and its polarization in the axial direction serves to convert the received pressure into an electric signal. An upper fixing screw 16 serves to firmly connect these members by pressing the upper outer-peripheral portion of the piezoelectric element 15. A pressure transmitting member guide 17 is provided for positioning the pressure transmitting member 14. The pressure receiving surface 13 is provided, on the backside thereof, with a portion 18 projecting from the pressure receiving surface.

The piezoelectric-type pressure sensor of this embodiment is constituted of the above-described members. Among these members, the fitting thread portion 12, the pressure receiving surface 13 and the upper fixing screw 16 are made of stainless steel each having an excellent heat resistance, and the pressure transmitting member 14 is made of a structural ceramic material which is superior in electric insulation and thermal insulation. The pressure transmitting member guide 17 is made of tetrafluoride ethylene resin, and the piezoelectric element 15 is made of lead-titanate piezoelectric ceramic material.

One of features of the present invention relates to a positional relationship between the upper fixing screw 16 provided at the inside of the sensor casing 11 and the fitting thread portion 12 of the sensor casing 11. The feature is such that the fitting thread portion 12 is located at a position remoter from the pressure receiving surface 13 (closer to the top of the drawing) than the upper fixing screw 16. The function and effect of the pressure sensor of this structure will now be described.

Figure 2:
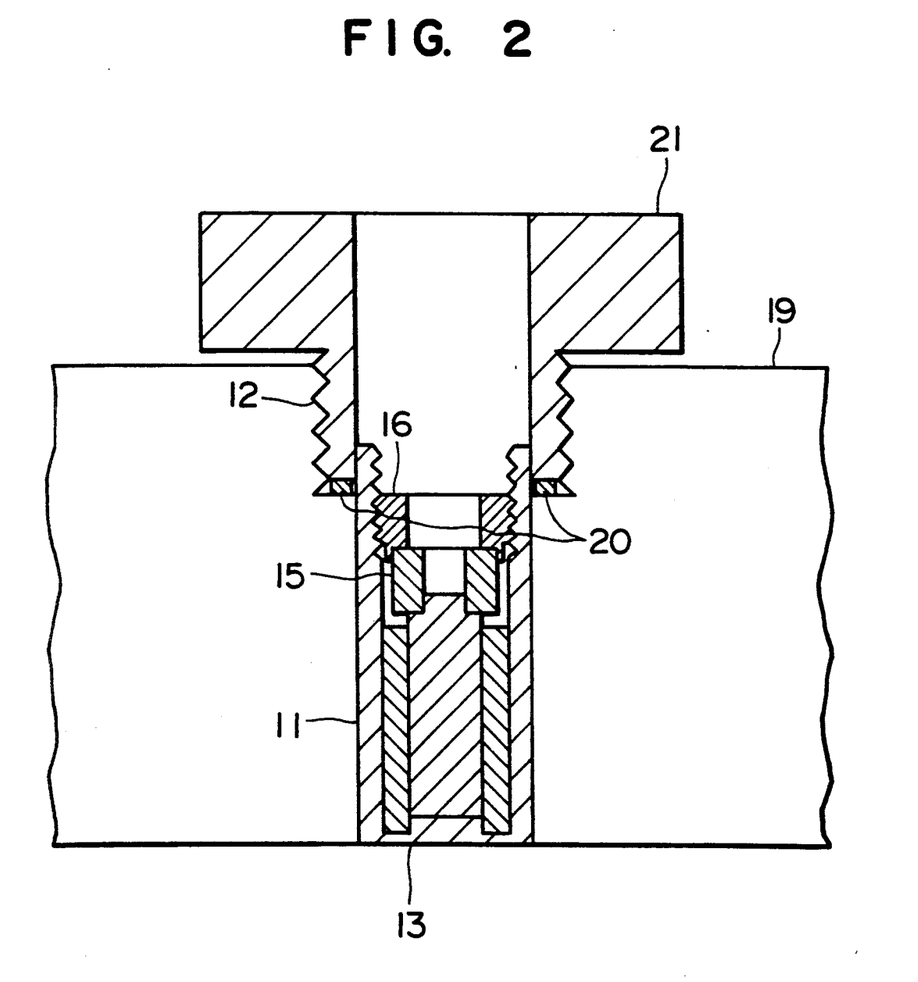
FIG. 2 is a cross-sectional view of the piezoelectric-type pressure sensor according to the first embodiment when it is fitted on a main body of an engine.

FIG. 2 illustrates the pressure sensor of FIG. 1 when it is fitted to the main body of the engine. As shown in the drawing, a seal member is set in position when fitting the pressure sensor to the main body of the engine. Unless such a seal member is used, the pressure of high-temperature gas in the region of the engine to be measured would cause the gas to leak through a gap between the sensor casing and the engine body so that the sensor casing will be entirely exposed to the high temperature gas. In order to effect sealing, a seal member is held between the bottom surface of the fitting thread portion and the engine body, as shown in FIG. 2, or held between the lower surface of the head of the sensor casing and the surface of the engine body, as shown in FIG. 3.

Referring to FIG. 2, a seal member 20 is provided between the engine body 19 and the sensor casing 11 so as to prevent the high-temperature and high-pressure as in the region to be measured from leaking. When the fitting thread portion 12 is being tightened to fit the sensor casing 11 onto the engine body 19, this tightening force Causes a part in the vicinity of the fitting thread portion 12 to receive a compressive force in the axial direction of the sensor casing 11, resulting in compressive distortion of this part in the axial direction, thereby the distance from the seal member 20 to the fitting thread portion 12 varies. However, the tightening force induces no distortion between the upper fixing screw 16 which fixes the piezoelectric element 15 and the pressure receiving surface 13, and consequently, there is caused no variation in the distance of this area, prestress or preliminary stress on the piezoelectric element 15 being unchanged.

Figure 3:
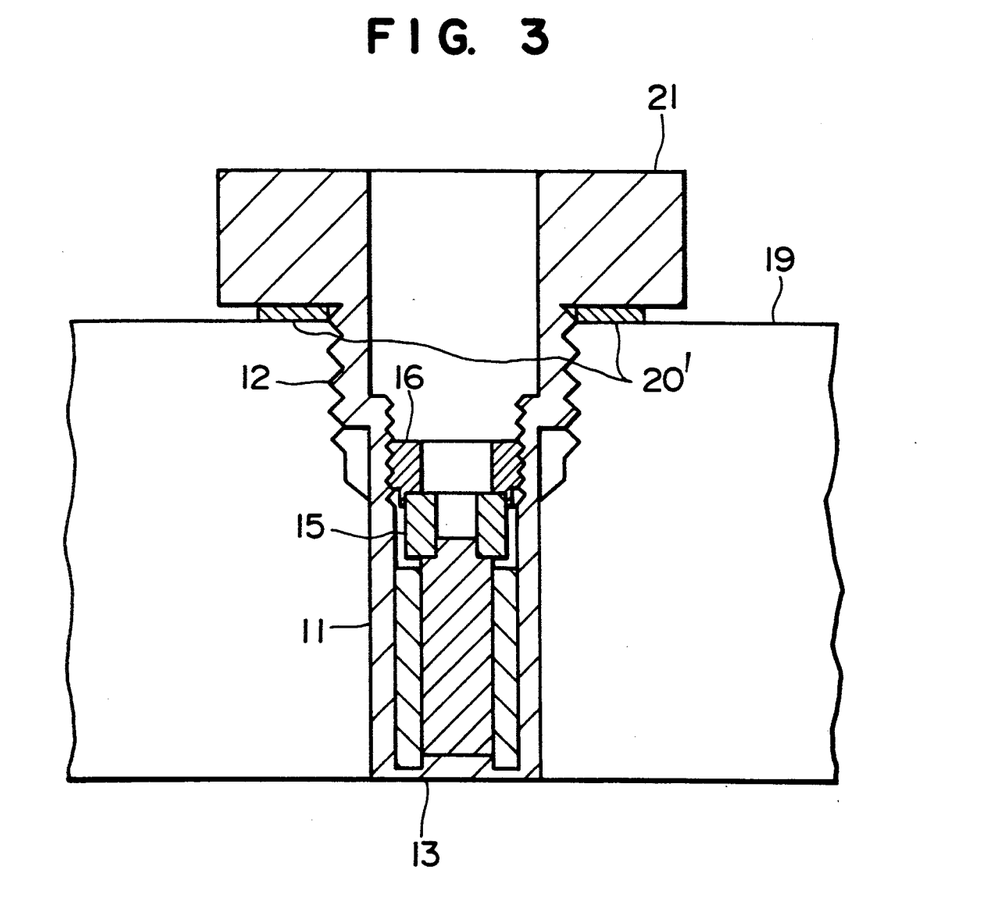
FIG. 3 is another cross-sectional view of the piezoelectric-type pressure sensor according to the first embodiment when it is fitted on a main body of an engine.

FIG. 3 illustrates another embodiment in which a seal member 20' is provided beneath the sensor casing head 21. In this embodiment, when the fitting thread portion 12 is tightened to fit the sensor casing 11 onto the engine body 19, this tightening force creates a tensile force over in a part in the vicinity of the seal member 20' in the axial direction of the sensor casing 11, resulting in tensile distortion of this area in the axial direction, thus changing the distance of each part in the vicinity of the seal member 20'. However, the tightening force gives no influence between the upper fixing screw 16 which fixes the piezoelectric element 15 and the pressure receiving surface 13, similar to the above-described embodiment, and therefore, there is caused no change in the pre-stress on the piezoelectric element 15.

Thus, such members as the upper fixing screw, the piezoelectric element and the pressure transmitting member are located closer to the region to be measured than the fitting thread portion so that there can be obtained the highly reliable sensor of the structure in which the tightening force that is generated during fitting the sensor casing onto the engine body, gives no influence to the pre-stress on the piezoelectric element.

Figure 7:
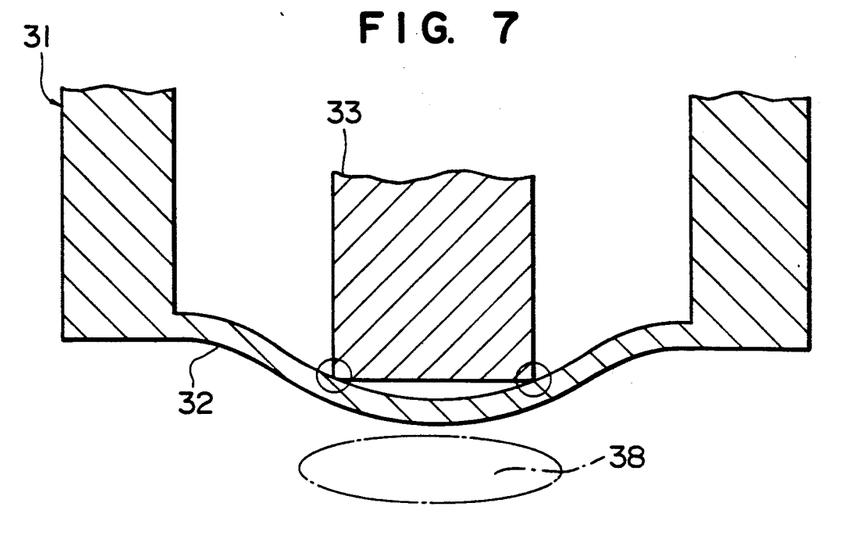
FIG. 7 is an enlarged cross-sectional view partially showing the conventional piezoelectric-type pressure sensor.
Figure 8:
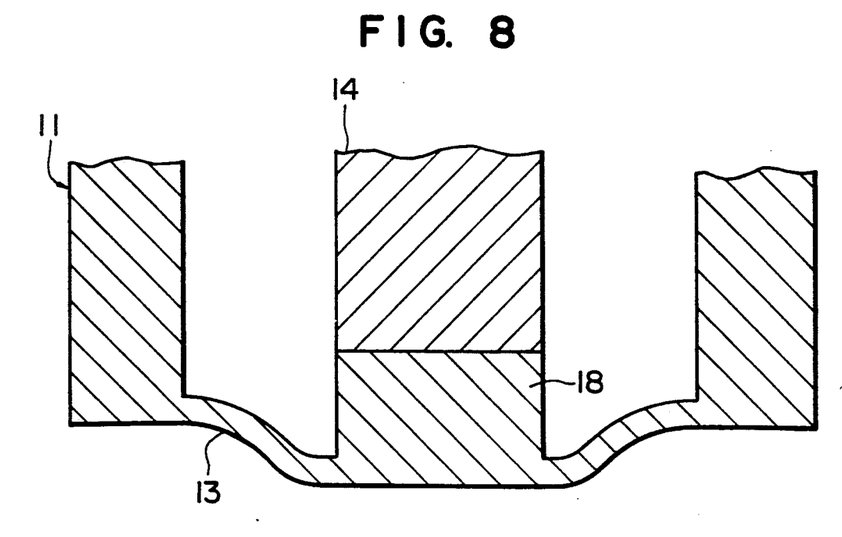
FIG. 8 is an enlarged cross-sectional view partially showing the piezoelectric-type pressure sensor according to the first embodiment.

Another characteristic of the present invention is such that the portion 18 projecting from the pressure receiving surface is provided on the backside of the pressure receiving surface 13, as shown in FIG. 1. An end face of the pressure transmitting member 14 is in surface contact with the projecting portion 18. FIG. 7 is an enlarged view partially showing the sensor when the upper fixing screw 16 is tightened to give pre-stress onto the piezoelectric element 15. Even if the pressure receiving surface 13 is bent downwardly under the influence of the pre-stress, as shown in this drawing, the pressure transmitting member 14 and the pressure receiving surface 13 are still in surface contact with each other through the projecting portion 18, so that corners of the bottom surface of the pressure transmitting member 14 will not be affected by the concentrated stress, and accordingly are prevented from being broken, thus enabling pressure transmission to be done reliably and accurately.

Figure 4:
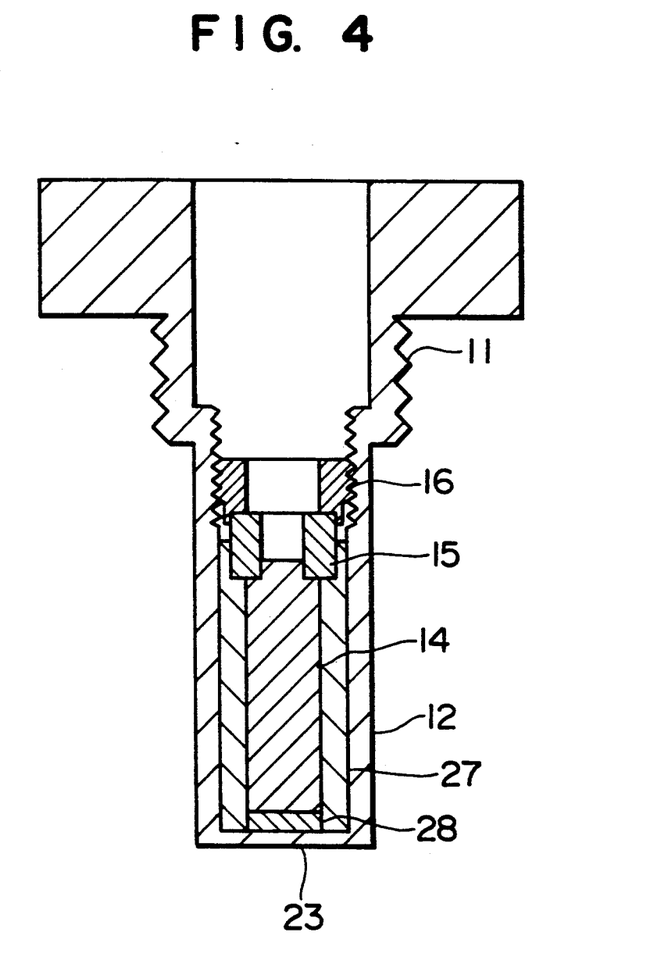
FIG. 4 is a cross-sectional view of a piezoelectric-type pressure sensor according to a second embodiment of the present invention.

There can be also employed a structure shown in FIG. 4. More specifically, the structure includes a pressure transmitting member spacer 28 of a disk-like shape provided between the pressure transmitting member 14 and a pressure receiving surface 23. The pressure transmitting member spacer 28 is made of soft metal such as aluminum or copper. With this arrangement, the pressure transmitting member spacer 28 can be maintained in surface-contact with the pressure transmitting member 14 when the pressure transmitting member 14 is pressed toward the pressure receiving surface 23 under the influence of the pre-stress. Besides, this surface-contact is performed by a ring-like surface of the pressure transmitting member spacer 28 which corresponds to the configuration of the backside of the pressure receiving surface 23. Therefore, the stress will not concentrate in some area on the contact surface of the pressure transmitting member 14, and the pressure transmitting member 14 will not be broken, thus enabling pressure transmission to be done reliably and accurately.

Referring again to FIG. 1, it should be noted that, especially because the pressure transmitting member guide 17 is employed in this embodiment, the position of the pressure transmitting member 14 can be adjusted. The pressure transmitting member guide 17 is machined to have a cylindrical shape such that the axis of the outer cylindrical surface and the axis of the inner cylindrical surface align with each other with a high degree of accuracy. Further, the outer cylindrical surface of the pressure transmitting member guide 17 is machined in order to make closely contact with and to be tightly inserted into the inside of the sensor casing 11, and the inner cylindrical surface of the pressure transmitting member guide 17 is machined such that the pressure transmitting member 14 and the projecting portion 18 will make closely contact with and to be tightly inserted into the inside of the guide 17. Consequently, when the pressure transmitting member guide 17 is fitted the sensor casing 11 before the pressure transmitting member 14 and the projecting portion 18 being inserted into this guide, the center of the pressure transmitting member 14 can precisely aligns with the center of the pressure receiving surface 13 and the center of its convex portion 18, and the axis of the pressure transmitting member 14 can be maintained precisely at a right angle to the pressure receiving surface 13 and the top surface of its projecting portion 18. With this pressure transmitting member guide 17, therefore, the pressure of the region to be measured which is applied to the pressure receiving surface 13 can be transmitted through the pressure transmitting member 14 to the piezoelectric element 15 reliably and accurately, enabling the pressure measurement without breakage of the pressure transmitting member 14 and the piezoelectric element 15.

The pressure transmitting member guide 17 should be arranged so as to avoid resisting inserting the pressure transmitting member 14, compressing it or interfering with the function of the pressure transmitting member 14 which transmits pressure to the piezoelectric element 15. On the other hand, it is required that the pressure transmitting member guide 17 adjusts the position of the pressure transmitting member 14. For this reason, tetrafluoride ethylene resin is used as a material of the pressure transmitting member guide. Tetrafluoride ethylene resin is characterized by having self-lubricating property and high electric insulation. Due to the self-lubricating property of tetrafluoride ethylene resin as the material of the pressure transmitting member guide, little friction is caused between the pressure transmitting member 14 and its guide 17, and the pressure transmitting member 14 can be moved in its axial direction with almost no resistance, although movement of the pressure transmitting member 14 in the radial direction is restricted by the pressure transmitting member guide 17. Accordingly, the pressure transmitted through the pressure transmitting member 14 will not be diminished by the pressure transmitting member guide 17.

The pressure transmitting member guide 17 may be formed so that it can adjust the position of the piezoelectric element 15 as well as the position of the pressure transmitting member 14, as shown in FIG. 4. Although the piezoelectric element 15 is positioned by the upper fixing screw 16, its thread portion may slightly sometimes loose. Therefore, a pressure transmitting member guide 27, which is adapted to adjust both position of the piezoelectric element 15 and position of the pressure transmitting member 14 enables stable and sure pressure transmission with a high degree of reliability, while preventing breakage of the pressure transmitting member 14 and the piezoelectric element 15. It is noted that a highly insulating material should be used for the pressure transmitting member guide because the output impedance of the piezoelectric element is so high that, even if a small amount of electric charge which has been generated on the electrodes leaks, the output is reduced, thus making it impossible to measure the pressure accurately. Tetrafluoride ethylene resin is one of the most insulating types of resin, and accordingly, leakage of electric charge through the pressure transmitting member guide 17 can be reduced to a minimum value so as to perform the pressure transmission with a high degree of reliability and a high degree of accuracy. Instead of tetrafluoride ethylene resin, any other material can be used for the pressure transmitting member guide as far as it has self-lubricating property and high electric insulation.

The pressure transmitting member guide of the configuration shown in FIG. 1 may be used in the embodiment shown in FIG. 4, and similarly, the pressure transmitting member guide of the configuration shown in FIG. 4 may be used in the embodiment shown in FIG. 1.

Although the pressure is applied to the piezoelectric element through shear in the above-mentioned embodiments, pressure application may be effected also through compression.

As described heretofore, according to the present invention, such members as the upper fixing screw, the piezoelectric element and the pressure transmitting member are located closer to the region to be measured than the fitting thread portion of the sensor casing so that there can be obtained the highly reliable piezoelectric-type pressure sensor of the structure in which the tightening force, which is generated when fitting the sensor casing onto the main body of the engine, gives no influence to pre-stress on the piezoelectric element so as to maintain the pre-stress at a predetermined value.

In addition, the portion projecting from the pressure receiving surface projects or the pressure transmitting member spacer is provided on the backside of the pressure receiving surface in order to ensure the surface-contact between the back surface of the pressure receiving surface and the pressure transmitting member, thus providing the steady and reliable piezoelectric-type pressure sensor.

What is claimed is:

1. A piezoelectric-type pressure sensor comprising:
   a casing including a pressure receiving surface and a thread portion, and having an outer peripheral surface extending from said pressure receiving surface to said thread portion and cylindrically formed;
   a pressure transmitting member provided in said casing, having one end and the other end, said one end making contact with the backside of said pressure receiving surface;
   a piezoelectric element provided in said casing and making contact with the other end of said pressure transmitting member; and
   an upper fixing screw provided at the inside of said casing while fixing one end of said piezoelectric element,
   said upper fixing screw, said piezoelectric element and said pressure transmitting member being located closer to said pressure receiving surface than said thread portion.

2. A piezoelectric-type pressure sensor according to claim 1, wherein a pressure is applied in such a manner that a shear stress is generated through said piezoelectric element so as to detect an electric charge generated by this shear stress.

3. A piezoelectric-type pressure sensor according to claim 1, wherein said piezoelectric element is made of a lead-titanate piezoelectric material.

4. A piezoelectric-type pressure sensor according to claim 1, wherein a positioning guide for adjusting the position of said pressure transmitting member is provided between said pressure transmitting member and the inner side wall of said casing or between said piezoelectric element, said pressure transmitting member and the inner side wall of said casing.

5. A piezoelectric-type pressure sensor according to claim 4, wherein said positioning guide is formed of tetrafluoride ethylene resin.

6. A piezoelectric-type pressure sensor comprising:
   a casing including a pressure receiving surface;
   a pressure transmitting member provided in said casing, having one end and the other end, said one end making contact with the backside of said pressure receiving surface;
   a piezoelectric element provided in said casing and making contact with the other end of said pressure transmitting member;
   an upper fixing screw provided in said casing while fixing one end of said piezoelectric element; and
   surface contact maintaining means provided between the backside of said pressure receiving surface and said pressure transmitting member so that said surface contact maintaining means and said pressure transmitting member are made in surface-contact with each other.

7. A piezoelectric-type pressure sensor according to claim 6, wherein said surface-contact maintaining means is a projecting portion formed on the backside of said pressure receiving surface.

8. A piezoelectric-type pressure sensor according to claim 6, wherein said surface-contact maintaining means is a spacer.

9. A piezoelectric-type pressure sensor according to claim 8, wherein said spacer is made of aluminum or copper.

10. A piezoelectric-type pressure sensor according to claim 6, wherein a pressure is applied in such a manner that shear stress is generated onto said piezoelectric element so as to detect an electric charge generated by this shear stress.

11. A piezoelectric-type pressure sensor according to any one of claims 6 to 10, wherein said piezoelectric element is made of a lead-titanate piezoelectric material.

12. A piezoelectric-type pressure sensor according to claim 6, wherein a positioning guide for adjusting the position of said pressure transmitting member is provided between said pressure transmitting member and the inner side wall of said casing or between said piezoelectric element, said pressure transmitting member and the inner side wall of said casing.

13. A piezoelectric-type pressure sensor according to claim 12, wherein said positioning guide is formed of tetrafluoride ethylene resin.

* * * * *